US008358751B2

(12) United States Patent
Parker et al.

(10) Patent No.: US 8,358,751 B2
(45) Date of Patent: Jan. 22, 2013

(54) METHOD FOR ESTABLISHING SUA SPONTE LARGE-SCALE PERSON-TO-PERSON EMERGENCY ELECTRONIC MESSAGING COMMUNICATIONS BASED IN PART ON SUBSCRIBER TELEPHONE NUMBERS

(76) Inventors: David H. Parker, Earlysville, VA (US); Ginger B. Parker, Earlysville, VA (US)

( * ) Notice: Subject to any disclaimer, the term of this patent is extended or adjusted under 35 U.S.C. 154(b) by 1239 days.

(21) Appl. No.: 12/215,858

(22) Filed: Jul. 1, 2008

(65) Prior Publication Data
US 2008/0297307 A1    Dec. 4, 2008

(51) Int. Cl.
*H04M 1/64* (2006.01)
*H04M 1/725* (2006.01)

(52) U.S. Cl. .................. 379/88.12; 455/412.1

(58) Field of Classification Search .................. 379/79, 379/88.12, 88.19, 201.01; 455/412.2
See application file for complete search history.

(56) References Cited

U.S. PATENT DOCUMENTS

| | | | |
|---|---|---|---|
| 3,881,060 A | 4/1975 | Connell et al. | |
| 5,572,576 A | 11/1996 | Klausner | |
| 6,879,668 B2 | 4/2005 | Neuwald | |
| 7,130,389 B1 * | 10/2006 | Rodkey et al. | 379/88.12 |
| 7,287,009 B1 | 10/2007 | Liebermann | |
| 7,321,655 B2 | 1/2008 | Skakkebaek et al. | |
| 7,330,537 B2 | 2/2008 | Frifeldt et al. | |
| 7,573,984 B2 | 8/2009 | Ger | |
| 7,817,982 B1 | 10/2010 | Chu | |
| 7,903,801 B1 | 3/2011 | Ruckart | |
| 8,023,621 B2 | 9/2011 | Hulls | |
| 8,130,922 B2 | 3/2012 | Ger | |
| 2001/0049745 A1 | 12/2001 | Schoeffler | |
| 2006/0193446 A1 | 8/2006 | Colunga | |
| 2007/0016458 A1 | 1/2007 | Angle | |
| 2007/0165789 A1 | 7/2007 | Hulls | |
| 2007/0201622 A1 | 8/2007 | Croak et al. | |
| 2007/0269023 A1 | 11/2007 | Klauer et al. | |
| 2008/0088428 A1 * | 4/2008 | Pitre et al. | 340/506 |
| 2008/0318569 A1 | 12/2008 | MacNamara | |
| 2009/0024473 A1 | 1/2009 | Friedman | |
| 2009/0239554 A1 * | 9/2009 | Sammour et al. | 455/458 |

OTHER PUBLICATIONS

FEMA National Emergency Family Registry and Locator System https://asd.fema.gov/inter/nefrls/disclaimer_search.htm (7 pages).
Contact Loved Ones http://www.contactlovedones.org/how-to-use-clo/ (3 pages).
Sharon Keating, Find Hurricane Katrina Survivors, about.com, Feb. 13, 2008, 3 pages.
Hurricane Katrina Help Center, cnn.com, Feb. 13, 2008, 4 pages.
American Red Cross, Safe and Well List, Feb. 7, 2008, 8 pages.
Adomo Voice Messaging, Getting Started, 2005, 11 pages.

* cited by examiner

*Primary Examiner* — Mohammad Islam
(74) *Attorney, Agent, or Firm* — David H. Parker

(57) ABSTRACT

Lessons of the Sep. 11, 2001 terrorist attack (9/11) and Hurricane Katrina are incorporated. Methods are disclosed for rapidly establishing alternate electronic messaging for person-to-person communications in a large-scale emergency. Details for constructing electronic access addresses comprised in part by subscriber telephone numbers and an event identifier, allows the provider to establish a default system with no specific information from the user while allowing the user to access the messages in a systematic way. No registration or passwords are required, which allows free access to all interested parties. Expedited contact of lost pet owners and parents, as well as identification of the dead, is provided.

16 Claims, 3 Drawing Sheets

METHOD FOR ESTABLISHING SUA SPONTE LARGE-SCALE PERSON-TO-PERSON EMERGENCY ELECTRONIC MESSAGING COMMUNICATIONS BASED IN PART ON SUBSCRIBER TELEPHONE NUMBERS

FIELD OF INVENTION

This invention relates to a method for rapidly establishing, sua sponte, a large-scale emergency electronic messaging communications system for person-to-person electronic messaging communications according to a robust default addressing architecture based in part on pre-existing subscriber telephone numbers. Electronic messages include, but are not limited to, voice mail, electronic text mail, electronic images, and data.

BACKGROUND OF THE INVENTION

Recent history in the United States has exposed a significant absence of a robust method for rapidly establishing large-scale person-to-person electronic communications. This was clearly demonstrated in the immediate aftermath of the terrorist attacks on the United States on Sep. 11, 2001 (9/11) and the flooding of New Orleans following hurricane Katrina on Aug. 29, 2005. Moreover, Katrina exposed a significant problem locating lost pet owners.

In the case of a terrorist attack, one of the objectives of an enemy, as defined in Title 18 section 2331 of the United States Code, is to intimidate or coerce a civilian population. This was clearly an objective of the terrorist attack of Sep. 11, 2001, as demonstrated by the choice of targets. One element of the intimidation was to amplify the actual destruction by producing anxiety for anyone that had family, friends, loved ones, or business associates in New York, Washington or traveling by airplane. This expanded the domain of anxiety to millions of people that felt the need to contact those potentially affected, for reassurance.

The reflex reaction to call and check on people produced a flood of calls which overloaded the communications systems. Those with cell phones experienced problems with the overload, and rapidly exhausted battery power with no access to chargers. This rendered surviving means for communicating severely impaired.

Moreover, millions of people witnessing the confusion and anxiety of the victims on television realized—but for the grace of God, there goes I. This realization prompted families and businesses to establish contingency plans for establishing communications in an emergency. However, even those that have established contingency plans usually only involve a close circle of people.

In the aftermath of the attack, people in New York resorted to posting notices on walls of adjacent buildings seeking information on others. People wishing to contact fellow workers, neighbors, and others whose communications systems had been destroyed were helpless. In cases of businesses, personnel records were destroyed or unavailable, leaving no systematic method for contacting employees and assessing plans for temporary operations at remote locations. Many of the businesses affected involved finance and world trade-expanding the anxiety to yet another domain involving people worldwide.

In the case of the flooding of New Orleans nearly 4 years later, it was demonstrated that the person-to-person communications system was no better. While the flooding was a result of a natural disaster, it quickly became apparent that a city with portions below sea level could be a potential terrorist target. As disastrous as the hurricane induced damage was (1836 lives were lost), a surprise terrorist sabotage of the levee system could have produced an even greater loss of life and the collective anxiety produced would have been comparable to September 11.

In addition to war, terrorism, and natural disasters (such as floods, hurricanes, tornadoes, fires, volcanic eruptions, tsunamis, etc.), major disruption in the communications systems can result from industrial and transportation accidents (such as train derailments, chemical plant fires, nuclear power plant malfunctions, etc.), requiring immediate evacuation of large areas. On a smaller scale, a fire in a large office complex or government organization would produce a need for rapidly establishing communications between fellow workers and within departments for determining well being and establishing plans for resumption of business activities. In many cases, workers may only know others in the work environment and not know how to contact them at home. Increasingly, younger people have a cell phone which is not listed in a directory, so even with a full name it may be impossible to contact them outside of normal channels.

Historically, in the aftermath of a major disaster, organizations such as the American Red Cross and the Federal Emergency Management Agency (FEMA) set up databases to connect victims with others. In the case of Hurricane Katrina the systems were completely overwhelmed. Thousands of victims from New Orleans were relocated to 28 states. Registration is typically on a one-on-one basis between the victim and a volunteer or staff member. No provisions were made for dealing with lost pets or expediting identification of the dead.

There is a problem of a unique, yet readily known, identification which this invention resolves for the great majority of the population. For example, a person may be known by a nickname, initials, or the spelling may be debatable. Victims may be illiterate, elderly, deaf, mute, or mentally challenged—any of which could make registration even more difficult.

There is a problem with privacy of information inherent with registration, which this invention solves. It gathers no personal information in a central database, and the users remain practically anonymous, except to those that know the individual personally.

The registration process is time consuming and the dissemination of the database can be inefficient. Registration requires logistical support and additional relief personnel at the scene of the disaster. This invention greatly alleviates the logistical requirements by dispensing with all registration requirements and planning at the individual level by providing a centrally administered default communications system that is ready on short notice for use by individuals.

The state-of-the art at the time of Katrina is illustrated by a web page by Sharon Keating titled FIND HURRICANE KATRINA SURVIVORS, List of Resources for Reconnecting with Missing Friends and Family, which is incorporated by reference herein. She listed 65 links as possible places to look for information. A similar web page by CNN lists 28 links under Locate the Missing, which is incorporated by reference herein. These two examples show how persons wishing to locate individuals heretofore are forced to search in a fishing expedition through various ad hock databases.

While still inadequate, some progress has been made. For example, following the tornadoes that struck across the south on Feb. 5, 2008, killing over 50 people, the American Red Cross activated a Safe and Well List on the Internet, the instructions for which are incorporated by reference herein. As of Feb. 7, 2008, 4811 people had registered. The required fields include: First Name, Last Name, Home address Line 1, Home City, Home State, Home Zip Code, Current City, and Current State. On acceptance of a Privacy Policy, the registrant my select from a field of 9 predefined messages, but has no option to enter a customized message. Interested parties may search the Safe and Well List on acceptance of the Privacy Policy. Required fields for the search of the registered are: the Last Name and either; the Pre Disaster Home Phone; or the Home Address Line 1, Home State, and Home Zip Code. The interested party can leave no message or acknowledgment that the message has been received. Moreover, a lost pet identified by phone number only could not be matched with an owner.

Clearly a rapid person-to-person communications method is needed—particularly one that is equipped to handle a large nomadic component.

In US Patent Application Pub. No.: US2007/0269023 A1, incorporated by reference, Klauer et al. discloses a subscriber method of crisis communications including a plurality of crisis communication points (CCPs) located in geographically dispersed areas. For a subscription fee, and by prior arrangement, a family gains access to a voice message system by a personal identifier, i.e., password. This allows two-way voice messaging between subscribers. While this system has merit for those that can afford the service and make plans in advance, it provides no assistance for those that can not afford the service or fail to anticipate the need, and it would require remembering the infrequently used personal identifier to gain entry. Moreover, it does not provide for communications between non subscribers such as neighbors, fellow workers, church associates, etc.

In US Patent Application Pub. No.: US2007/0165789 A1, incorporated by reference, Hulls discloses a Dynamic Family Disaster Plan with similar limitations as Klauer, e.g., the need for individual planning in advance.

Many telephone subscription services include voice messaging with enhanced bundled services such as caller ID. In principle, the subscriber could access the recorded greeting and modify the message to update callers as to the subscriber's status, and retrieve messages from a remote location. This would require all family members remembering the access code and instructions, which is typically only remembered by one family member at best. Such normally desirable privacy constraints could inhibit use or render it unreliable as a means for voice messaging. Most subscriber owned voice messaging systems also provide for remote access with an access code. These systems suffer from the same privacy constraints and if the telephone service or power is off at the subscriber location they would be rendered useless.

The need exists for a robust rapidly executable communications method that requires minimum preparation by the individual. Preferably it would be implemented by a single authority or sponsor, sua sponte, thereby reducing duplication and uncertainty as to where to search for an individual, i.e., a virtual pre-defined default communications meeting place. It should dispense with security constraints and knowledge about an individual such as passwords street addresses, etc.

The basis for an identification system exists in the form of pre-emergency subscriber telephone numbers. For example, most people know, or have ready access to the phone numbers of individuals of interest. This would include home, cell, and work phone numbers. Often times even small children and the mentally challenged know phone numbers for family and friends. Even the phone numbers that are not known are probably available through a third party that can relay a message. This instant knowledge of telephone numbers is exploited by Liebermann in U.S. Pat. No. 7,287,009, incorporated by reference, and by merchants such as Auto Zone, Kroger Plus Shopper's Card, pizza delivery services, credit card verification services, laundry and dry cleaning services, etc., for customer identification. The customer is identified by called ID or by entering the well known phone number. However, in all known examples, the number is used to qualify the transaction and link to a predefined database, i.e., prior administrative work is required.

The hardware foundation for a person-to-person voice message and email message system already exists. For example, in U.S. Pat. Nos. 7,321,655 and 7,330,537, which are incorporated by reference, Skakkeback et al., and Frifeldt et al. teach integrated cache systems that provide wide access to voice mail and email services. Internet email services are widely available free of charge from providers such as Yahoo, Microsoft, etc.

The problem to be solved is to employ the existing hardware capabilities in such a way as to make the resources available in a systematic temporary arrangement on short notice with no a priori planning on the part of the individuals, i.e., implemented by a sponsor, sue sponte.

The missing link in the art is a method to integrate diverse technologies and a sponsor with the resources to secure, or contract for, the hardware, conduct the planning, publicize the existence of, and sua sponte trigger execution when needed.

BRIEF SUMMARY OF THE INVENTION

Methods are disclosed for rapidly establishing alternate electronic messaging for person-to-person communications in a large-scale emergency. Details for constructing electronic access addresses comprised in part by subscriber telephone numbers and an event identifier, allows the provider to establish a default system with no specific information from the user while allowing the user to access the messages in a systematic way. No registration or passwords are required, which allows free access to all interested parties.

DETAILED DESCRIPTION OF THE INVENTION

Figure 1:
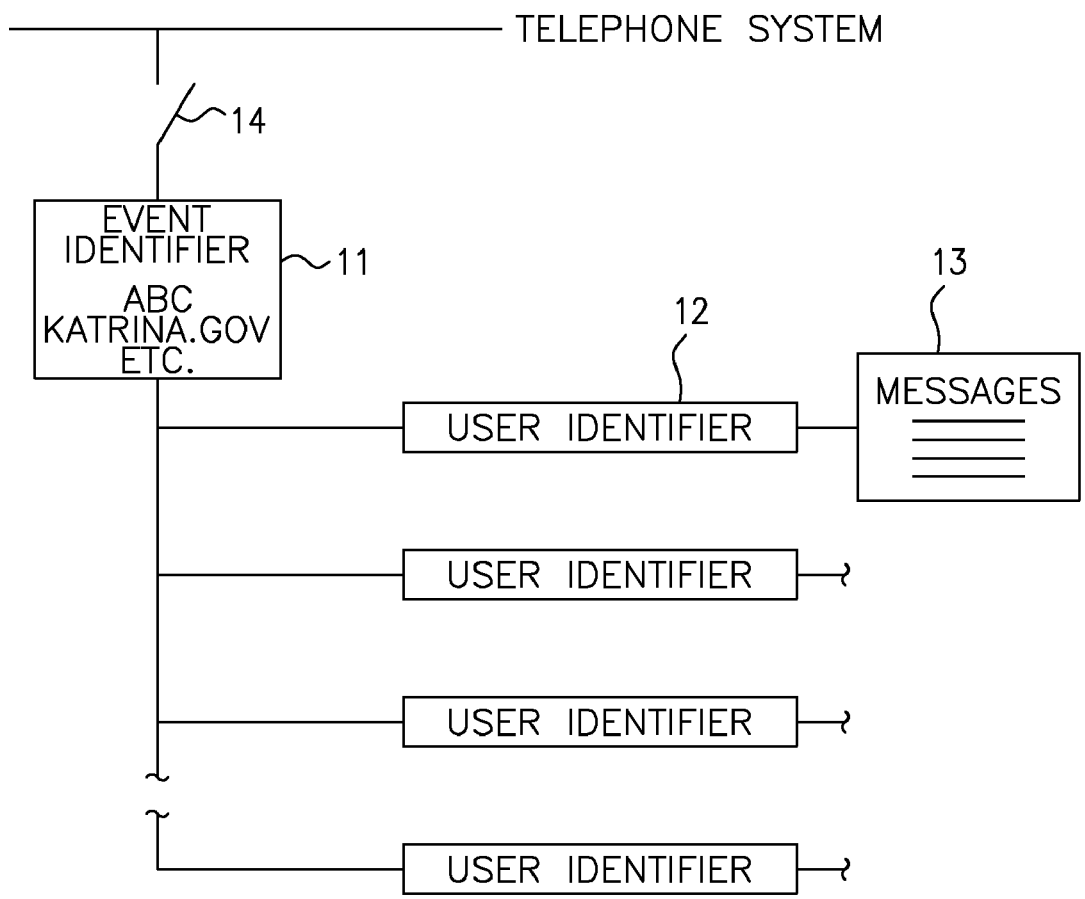
FIG. 1 is a block diagram of the telephone system connection to the event identifier, user identifier, and messages.

Methods will be disclosed for creating communications overlays, where an overlay will be described in more detail hereinbelow. It will be understood that electronic messages include, but are not limited to, voice mail, electronic text mail, electronic images, and data. An action taken sua sponte will be understood to be unilaterally taken by a sponsor without requirements from the user, e.g., no registration or password requirements.

Implementation breaks down into two major systems requirements. Creation of a communications overlay requires a unique identifier for each cell. The identifier must be generated by a simple algorithm which can be understood by the masses without individual registration or ambiguity. Hardware and software must be provided at minimal expense and preferably maximizing off the shelf elements and/or preexisting resources.

Electronic Access Address

Modern electronic communications in the form of the telephone system and the Internet provide an architecture for providing a large-scale communications system overlayed on the existing subscriber telephone and email systems, e.g., but not limited to, creating a temporary large-scale block of telephone voice mail boxes and/or email accounts. This requires a plurality of electronic access addresses where it is understood that an electronic access address could be a telephone number, email address, or other electronic address. In the preferred embodiment, the overlayed system should not affect the functioning communications system, but should augment by providing a default contingency plan. In the preferred embodiment, the system should be capable of being activated in a time frame of less than one hour.

The United States telephone number system is comprised of a 3 digit area code, 3 digit exchange, and a 4 digit subscriber number. In combination, the 10 digit number uniquely directs a call to a specific subscriber. By default, a call can be placed within an area code by only dialing the last 7 digits of a number. Alternately, a number in another country may be called directly by preceding the call with the International Access Code 011, followed by the Country Code, i.e., A 10 digit number in the United States may be duplicated in another country, but by default the call is routed within the United States, unless preceeded by the requisite prefix numbers. Likewise, the least significant 7 digit numbers may be duplicated between area codes, i.e., the numbers are overlayed. A 7 digit number provides $10^7$, or 10,000,000 unique phone numbers. All numbers are not in active use by subscribers and not all combinations are available, e.g., 911 can not be a valid area code. So in practice the number of usable combinations is less than $10^7$.

In a large-scale event such as the flooding of New Orleans, $10^7$ candidate phone numbers would be more than adequate to accommodate the number of displaced, or nomadic, people.

A central planning sponsor such as The Federal Emergency Management Agency (FEMA), The American Red Cross, or a state emergency planning authority, could assume responsibility for emergency person-to-person communications. This would avoid overloading the communications systems with useless attempts, needless duplication of resources, and ambiguity as to how the individual is to respond to an emergency. It will be understood that while a United States Government or established emergency agency is a preferred sponsor, a corporate sponsor, or a foreign government could also act.

It will be apparent to those skilled in the art that implementing a large-scale block of electronic access addresses is a minor software program. The significant obstacle is pairing individuals with the resources through the electronic access addresses in a unilateral method, i.e., the authority unilaterally builds a system, and the individual elects to accesses the system, or not. In other words, the sponsor builds a system and the individuals use it if they so choose.

In this respect, the 911 emergency phone system disclosed by Connell et al. in U.S. Pat. No. 3,881,060 is a good example. A traveler anywhere in the United States knows by default that they can call the universal number 911 in an emergency, without need to know under which authority they actually need to call, i.e., city, county, state, or a specific unique phone number for that locality.

Either an unused area code, or some other unique prefix known in the art, such as the method used by prepaid calling cards (caller dials a universal toll free number and then directs the call to the desired subscriber), could be assigned to create a virtual overlay of the 7 digit subscriber telephone number system. Hereinafter virtual overlay is defined to be an electronic communications system residing in memory in which at least a portion of the electronic access address is comprised of an event designated default portion of preferably at least 3 digits; in combination with a number of at least 4 digits and preferably at least 7 digits, e.g., a virtual overlay could designate an unused 3 digit area code combined with a 7 digit user identifier code.

The sponsor could broadcast the event identifier to the individuals, and the individuals would combine that with their subscriber telephone number, acting as a user identifier, to construct an electronic access address that would be unique to the event at hand.

The elegance of the method will become apparent to those skilled in the art from the Figures and details of the preferred embodiments.

First Preferred Embodiment

Figure 2:
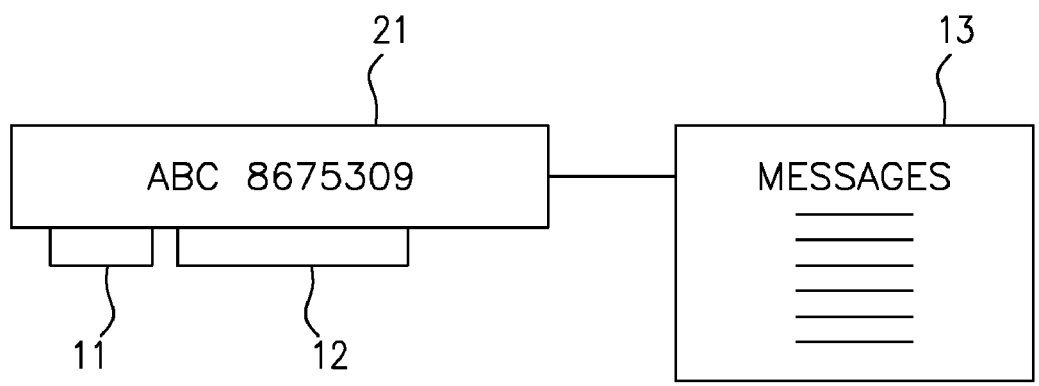
FIG. 2 is a block diagram of the event identifier and user identifier combined to construct the electronic access address for a voice mail system.

The First Preferred Embodiment employs an architecture based on the telephone infrastructure and electronic voice mail as shown in FIG. 1 and FIG. 2.

The virtual overlay system provides capability for recording and playing voice messages, i.e., voice mail. The system is activated 14 by connecting to the public telephone network by the responsible sponsor and requires no access password. In a typical scenario, a sponsor would publicize the system existence prior to an emergency, and activate the system prior to a known threat, such as a hurricane, or immediately after an event. For example, an unused area code, which will be designated ABC, hereinafter will be understood to mean a 3 digit symbol available on the conventional 12 button telephone, 0-9, *, and #, would be designated for the event as the event identifier 11. The public would be advised that in an interruption of telephone services, or in a nomadic situation, they should call the electronic access address 21 constructed of the event identifier 11 ABC, followed by their subscriber 7 digit phone number user identifier 12. The caller would be given the option of recording a message 13 or playing back messages 13, but could not delete messages 13, i.e., the messages would be managed by the sponsor in a methodical manner to conserve resources and avoid conflicts. The system would be available to anyone on a toll free basis with no expectation of privacy or preferential ownership privileges. It will be apparent that by such a system, people could establish person-to-person messaging and thereby establish more direct alternate means of communication, e.g., a hotel name, cell phone number, etc.

The sponsor could limit the length of messages to help free communications systems. It could also limit the memory available by pushing out older messages (first in first out) as the allocated memory is exceeded. It will be apparent to those skilled in the art that $10^7$ voice mail boxes would far exceed the requirement for most emergencies. Rather than providing the full capability by default, it would conserve hardware requirements by dynamically allocating boxes. For example, when a number is called the computer could check to see if it has been initiated. If so, simply route the call to that box. If this is the first call to that number, automatically allocate a box to that number and route the call to that box. It will also be apparent to those skilled in the art, that an event would likely involve more than one area code. In that event, callers will simply share the same box in a party line arrangement with no expectation of privacy.

It will be apparent to those skilled in the art that such a system would be subject to spam calls. Spam filters are well known in the art and it would be desirable to include such a filter at the head end. It would also be desirable to include the entire ABC prefix under the national do not call registration protection.

Second Preferred Embodiment

Figure 3:
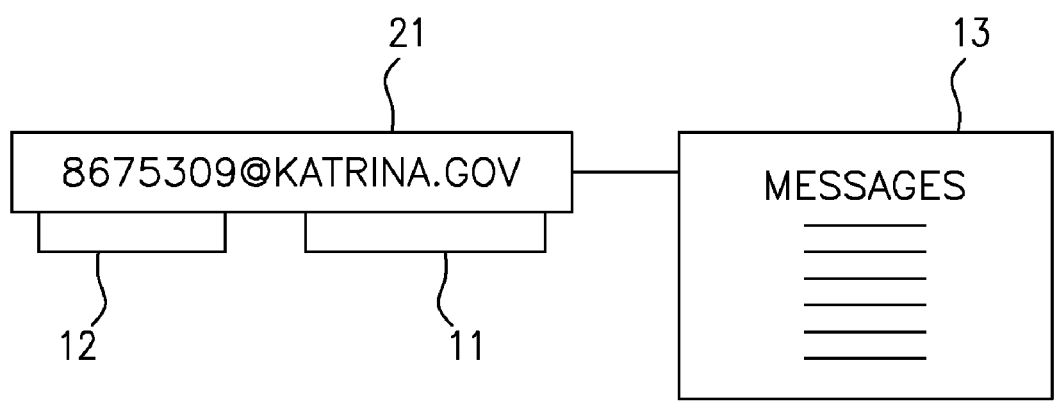
FIG. 3 is a block diagram of the event identifier and user identifier combined to construct the electronic access address for an email system.

In the case of the Internet, a domain could be used to differentiate the emergency system from the existing email system, i.e., the ABC prefix would not be required. For example, as shown in FIG. 3, email addresses could be created using all possible 7 digit telephone numbers as the user identifier 12 in combination with a unique domain as the event identifier 11 to construct the electronic access address 21, such as 8675309@katrina.gov. Individuals would go to the default email address 21 to check for all messages 13 and email could be sent from any email address to the designated email address. No password would be required to log into the email, so all messages would be available to all interested parties. Email could be forwarded, or replied to, but not deleted. Addresses could be dynamically allocated as in the First Preferred Embodiment, or simply created for all possible combinations. It will be recognized that spam and message length could be controlled by techniques well know in the art.

Third Preferred Embodiment

The Third Preferred Embodiment employs an architecture based on integrating the telephone system and the Internet and electronic mail (email) as described hereinafter.

In U.S. Pat. No. 7,330,537 Frifeldt et al. discloses an integrated messaging server directory service with a communication system voice mail message interface, which is incorporated by reference hereinabove. This system, sold by Adomo Incorporated of Cupertino, Calif., is described in the Adomo Voice Messaging Getting Started manual which is incorporated by reference herein. Section 8 describes a system that integrates voice messages into Microsoft Outlook whereby voice messages are accessed by a personal computer. An incoming message is routed to the designed PC Outlook account. Messages generate an email message listing the incoming voice messages by sender and time. The messages can then be played in the selected order. It will be apparent to those skilled in the art that such a system my be exploited by the First Preferred Embodiment for voice message management and playback on a PC in parallel with telephone access, as well as integrating the Second Preferred Embodiment for email messages.

Having described the methods, many variations of the invention will become apparent to those skilled in the art, which are disclosed in the claim limitations. For example, lost pet owners will be more easily contacted by including a telephone number identification on the pet. Schools and teachers can rapidly contact children's parents by simply asking the children for their phone numbers. Identification of bodies can be expedited by expanding the contact to extended family and friends that would otherwise not be located without extensive research. Neighbors can more easily check on each other and provide assistance, even under nomadic conditions. The communications systems would be freed of needless traffic which would expedite more pressing emergency use. The psychological impact of a terrorist attack would be lessoned, and possibly deterred.

What is claimed is:

1. A method for emergency communications, with steps comprising:

(a) providing by a sponsor, sua sponte, equipment configured to receive, store, retrieve, and play, in a nonpreferrential manner, electronic messages associated with one of a plurality of electronic access addresses;
(b) establishing by the sponsor, an event identifier;
(c) communicating from the sponsor to the public at large, a prescribed manner for constructing the plurality of electronic access addresses;
(d) communicating from the sponsor to the public at large, the event identifier;
(e) configuring by the sponsor, the plurality of electronic access addresses of the equipment, based at least in part on the event identifier, a plurality of user identifiers, and the prescribed manner;
(f) activating the equipment by the sponsor, and making the equipment accessable for use by the public at large starting at a first time, wherein the first time is based at least in part on recognition of a start of the emergency by the sponsor;
(g) configuring by the public at large, at least one electronic access address, based at least in part on the event identifier, at least a part of a subscriber telephone number, and the prescribed manner;
(h) using the equipment by the public at large to receive, store, retrieve, and play the electronic messages associated with the at least one electronic access address; and
(i) deactivating the equipment by the sponsor, and making the equipment unaccessable for use by the public at large starting at a second time, wherein the second time is based at least in part on recognition of an end to the emergency by the sponsor.

2. The method of claim 1, wherein:
in step (a) the equipment is a voice mail system.

3. The method of claim 1, wherein:
in step (a) the equipment is an email system.

4. The method of claim 1, wherein:
in step (e) the plurality of user identifiers comprises a universe of all possible permutations of at least 4 numerical digits.

5. The method of claim 1, wherein:
in step (e) the plurality of user identifiers comprises a universe of all possible permutations of at least 7 numerical digits.

6. The method of claim 1, wherein:
in step (b) the event identifier consist of symbols available on a telephone keypad.

7. The method of claim 1, wherein:
in step (b) the event identifier is associated with a name selected from the group consisting of a hurricane, a flood, a tornado, an earthquake, a fire, a volcanic event, a tsunami, an industrial accident, a transportation accident, an act of war, the sponsor, a government agency, a not for profit organization, a company, and an advertiser.

8. The method of claim 1, wherein:
in step (b) the event identifier is allocated for a specific event and expires after the event is over.

9. The method of claim 1, wherein:
in step (b) the event identifier is a telephone area code.

10. The method of claim 1, wherein:
in step (b) the event identifier is a telephone country code.

11. The method of claim 1, wherein:
in step (b) the event identifier is an Internet domain.

12. The method of claim 1, wherein:
in step (h) the public at large may not delete messages.

13. The method of claim 1, wherein:
in step (h) the electronic access address is directly dialed on a telephone in one operation.

14. The method of claim 1, wherein:
in step (h) there is no expectation of privacy of a message stored on the equipment by the public at large.

15. The method of claim 1, wherein:
in step (g) there is no expectation of preferential ownership privleges of the at least one electronic access address by the public at large.

16. The method of claim 1, wherein:
in step (h) at least one message is forwarded by a member of the public at large to a private email account.

* * * * *